US010704237B2

(12) United States Patent
Wu et al.

(10) Patent No.: US 10,704,237 B2
(45) Date of Patent: Jul. 7, 2020

(54) COLD WATER RECYCLING AND REUSING APPARATUS

(71) Applicant: KYLIN Sanitary Technology (Xiamen) Co., Ltd., Fujian (CN)

(72) Inventors: Boqing Wu, Fujian (CN); Hui Huang, Fujian (CN); Cungui Lai, Fujian (CN); Qingshuang Li, Fujian (CN)

(73) Assignee: KYLIN Sanitary Technology (Xiamen) Co., Ltd., Fujian (CN)

( * ) Notice: Subject to any disclaimer, the term of this patent is extended or adjusted under 35 U.S.C. 154(b) by 40 days.

(21) Appl. No.: 16/027,392

(22) Filed: Jul. 5, 2018

(65) Prior Publication Data

US 2019/0345698 A1 Nov. 14, 2019

(30) Foreign Application Priority Data

May 14, 2018 (CN) ...................... 2018 2 0711180 U

(51) Int. Cl.

| | |
|---|---|
| ***E03B 7/04*** | (2006.01) |
| ***E03B 1/04*** | (2006.01) |
| ***E03C 1/04*** | (2006.01) |

(52) U.S. Cl.

CPC .............. *E03B 7/045* (2013.01); *E03B 1/048* (2013.01); *E03C 1/0408* (2013.01)

(58) Field of Classification Search

CPC ......... E03B 1/048; E03B 7/045; E03C 1/0408

See application file for complete search history.

(56) References Cited

U.S. PATENT DOCUMENTS

| | | | | |
|---|---|---|---|---|
| 4,673,006 A * | 6/1987 | Speck | B08B 9/0933 | 137/892 |
| 5,794,643 A * | 8/1998 | Brice | E03B 7/04 | 122/13.3 |
| 7,490,373 B1 * | 2/2009 | Zavala-Avelar | E03B 1/048 | 4/616 |
| 8,517,056 B2 * | 8/2013 | Cullin | E03B 1/04 | 137/337 |
| 8,876,012 B2 * | 11/2014 | McMurtry | E03B 1/048 | 236/12.13 |
| 9,074,356 B2 * | 7/2015 | Tarantino | E03B 1/042 | |
| 2009/0165875 A1 * | 7/2009 | Winn | E03B 1/04 | 137/624.27 |

* cited by examiner

*Primary Examiner* — Kevin F Murphy

(74) *Attorney, Agent, or Firm* — JCIPRNET

(57) ABSTRACT

A cold water recycling and reusing apparatus includes a water inlet pipe, a cold water recycling apparatus, a recycling pipe, a cold water return apparatus, a return pipe, a recycling container, and a water outlet terminal. The cold water recycling apparatus is installed at a location near the water outlet terminal. The cold water return apparatus is installed at a location behind the cold water recycling apparatus. The cold water recycling apparatus enables cold water to flow into the recycling container via the recycling pipe. The cold water return apparatus draws the water in the recycling container into the water inlet pipe via the return pipe. The water is adapted to mix with hot water and flows out of the water outlet terminal.

8 Claims, 10 Drawing Sheets

D A G B E C F

COLD WATER RECYCLING AND REUSING APPARATUS

CROSS-REFERENCE TO RELATED APPLICATION

This application claims the priority benefit of China application serial no. 201820711180.8, filed on May 14, 2018. The entirety of the above-mentioned patent application is hereby incorporated by reference herein and made a part of this specification.

BACKGROUND OF THE INVENTION

1. Field of the Invention

The invention belongs to the field of bathrooms, and specifically relates to a cold water recycling and reusing apparatus installed on a water outlet terminal.

2. Description of Related Art

In daily life, when hot water needs to be used, for example, in a shower, especially in an occasion where the hot water is remotely supplied, when a valve is opened, a portion of water existing in a pipe is cold, and the portion of water existing in the pipe is required to be discharged, so that temperature of output water can be slowly increased. Because the pipe is also cold, the output water needs to reach a proper temperature for heating the cold pipe. Such heating process makes the temperature of water rise in a slower manner and discharges much water, which is a waste of cold water and goes against the concept of energy conservation and environment protection.

SUMMARY OF THE INVENTION

The invention is directed to a cold water recycling and reusing apparatus installed on a water outlet terminal, to resolve a problem of wasting cold water.

To achieve the foregoing purpose, following technical solutions are adopted in the invention.

A cold water recycling and reusing apparatus includes a water inlet pipe, a cold water recycling apparatus, a recycling pipe, a cold water return apparatus, a return pipe, a recycling container, and a water outlet terminal. The cold water recycling apparatus is installed at a location near the water outlet terminal of the water inlet pipe. The cold water return apparatus is installed at a location behind the cold water recycling apparatus of the water inlet pipe. The cold water recycling apparatus enables cold water to flow into the recycling container via the recycling pipe. The cold water return apparatus draws the water in the recycling container into the water inlet pipe via the return pipe. The water is adapted to mix with hot water and flows out of the water outlet terminal.

Further, the cold water return apparatus includes a return pipe body, a return connector, and a dynamic return structure. The return pipe body is installed on the water inlet pipe. The return connector is disposed on the return pipe body. The return connector has an internal cavity in communication with that of the return pipe body. The return pipe has one end connected to an end of the return connector, and another end inserted into the recycling container. The dynamic return structure draws the water in the recycling container to the return pipe body via the return pipe and the return connector, such that the water flows into the water inlet pipe.

Further, the cold water recycling apparatus includes a housing, a temperature-sensing switch component, a hot water outlet control component, and a cold water switching component. The temperature-sensing switch component, the hot water outlet control component, and the cold water switching component are disposed in the housing, and cooperate with each other for recycling cold water. The temperature-sensing switch component includes an case body and a temperature-sensing switch apparatus. The case body has a water inlet and a water outlet disposed thereon and a water inlet channel, a cold water outlet channel, and a hot water outlet channel disposed therein. The cold water outlet channel and the hot water outlet channel lead to the water outlet, and the temperature-sensing switch apparatus is installed at a location where the water inlet channel, the cold water outlet channel, and the hot water outlet channel communicate, and is adapted to automatically switch the water inlet channel to communicate with the hot water outlet channel or the cold water outlet channel according to incoming water temperature.

The hot water outlet control component is installed in the hot water outlet channel, and is adapted to control whether to apply the hot water or not.

The cold water switching component includes a cold water recycling channel and a cold water switching apparatus. The cold water switching apparatus is installed at a location where the cold water outlet channel and the cold water recycling channel communicate, and is adapted to switch the cold water flows out of the cold water outlet channel or the cold water recycling channel.

Further, the dynamic return structure of the cold water return apparatus includes an altering segment formed at a location where the internal cavity of the return pipe body and an internal cavity of the water inlet pipe communicate, so as to form a cavity in the internal cavity of the return pipe body, which thins down relative to the internal cavity of the water inlet pipe, and a plug installed on the altering segment, and having an end portion that is formed with a group of through holes for ensuring water is accelerated when flowing through the plug and forming a negative pressure. The return connector and the return pipe body are formed as one piece. A group of abruptly-thinning siphon holes are formed at a location where the internal cavity of the return connector and the internal cavity of the return pipe body are connected. When the water in the water inlet pipe flows through the plug, the negative pressure formed due to a siphon principle draws the water in the recycling container into the cavity of the return pipe body via the return pipe.

Further, the dynamic return structure of the cold water return apparatus includes a pump installed at a distal end of the return pipe. The pump is connected to a battery case and a floating switch that are received in the recycling container. A return chamber having an opening on a side thereof is formed at a location where the return connector and the internal cavity of the return pipe body communicate. A check valve is disposed at the opening.

Further, the dynamic return structure of the cold water return apparatus includes a pump installed at a distal end of the return pipe, and a hydroelectric generator installed at an end where the return pipe body and the water inlet pipe are connected. The hydroelectric generator is connected to the pump. A return chamber having an opening on a side thereof is formed at a location where the return connector and the internal cavity of the return pipe body communicate. A check valve is disposed at the opening.

Further, the temperature-sensing switch apparatus includes a temperature-sensing spring, a reset spring, and a mandrel. A first positioning base is disposed adjacent to an inlet of the water inlet channel. The positioning base includes a base portion and a cylindrical protrusion protruding from the base portion, A cylindrical second positioning base is disposed at a distal end of the water inlet channel. The second positioning base has a side wall having an inlet of the cold water outlet channel disposed thereon. The mandrel is movably disposed between the first positioning base and the second positioning base and includes a circumferential convex shoulder disposed thereon. The circumferential convex shoulder includes a rod-shaped portion located on a side of the circumferential convex shoulder, and a hollow stick portion located on another side of the circumferential convex shoulder. The rod-shaped portion is capable of moving in the cylindrical protrusion, the hollow columnar portion is capable of moving in the second positioning base. The temperature-sensing spring is sleeved on the rod-shaped portion and the cylindrical protrusion, and has one end abutting against the circumferential convex shoulder, and another end abutting against the base portion. The reset spring has one end abutting against a bottom end of a hole of the hollow stick portion, and another end abutting against a bottom portion of the second positioning base. The circumferential convex shoulder cooperates with an opening of the second positioning base. A sealing ring is disposed on the circumferential convex shoulder.

The hot water outlet control component includes an operating member, a valve base, a first valve core, and a reset spring. The operating member is fixedly connected to the first valve core. The valve base is fixedly installed in the case body and has an outer wall having a first sealing ring that is disposed thereon. The valve base includes a small-diameter hole part and a large-diameter hole part in communication with each other. The first valve core is movably penetrates the small-diameter hole part and the large-diameter hole part of the valve base. The first valve core is sealedly jointed with the small-diameter hole part via a second sealing ring, and has a distal end having a circumferential sealing ring installation groove disposed thereon. The sealing ring installation groove has a third sealing ring installed therein. The distal end of the first valve core cooperates with an inlet of the hot water outlet channel. The reset spring is sleeved on the first valve core and has one end abutting against the sealing ring installation groove, and another end abutting against an adjacency between the large-diameter hole part and the small-diameter hole part.

The cold water switching apparatus includes a rotatable cold water recycling pipe connector, a valve base, a second valve core, and a spring. The cold water recycling pipe connector is screwedly coupled to the valve base, and includes a first position and a second position spaced from each other in 90 degrees. The second valve core is movably disposed in an empty cavity of the valve base, and is driven by the cold water recycling pipe connector. The spring has one end abutting against the second valve core, and anther end abutting against a bottom portion of the valve base. When the cold water recycling pipe connector is at the first position, the second valve core closes the cold water recycling channel, so that the cold water flows out of the cold water outlet channel. When the cold water recycling pipe connector is at the second position, the second valve core closes the cold water outlet channel, so that the cold water flows out of the cold water recycling channel.

Further, the distal end of the first valve core includes an axial opening. A wall of the inlet of the hot water outlet channel has a protrusion disposed thereon and movably received in the axial opening.

A circumferential convex shoulder is disposed on the second valve core. A seal ring is installed on the circumferential convex shoulder. The spring has one end abutting against the bottom portion of the valve base, and another end abutting against the circumferential convex shoulder. When the cold water recycling pipe connector is at the first position, the circumferential convex shoulder closes the cold water recycling channel, so that the cold water flows out of the cold water outlet channel. When the cold water recycling pipe connector is at the second position, the circumferential convex shoulder closes the cold water outlet channel, so that the cold water flows out of the cold water recycling channel.

Further, a check valve is installed at an outlet of the hot water outlet channel.

Based on the above, the cold water recycling and reusing apparatus of the invention is installed on the water outlet terminal, has a simple and compact structure, is convenient to use, and can automatically turn off output water when hot water arrives. Therefore, a user may make the utmost of time when waiting for the hot water. In addition, previously discharged cold water can be discharged into the recycling container via the cold water recycling pipe. The cold water collected in the recycling container is drawn back to the water inlet pipe via the cold water return apparatus. The cold water is mixed with the hot water, and the mixed water flows out of the water outlet terminal to achieve the purpose of recycling and reusing, so that water conservation is improved.

BRIEF DESCRIPTION OF THE DRAWINGS

The accompanying drawings described herein are intended to provide further understanding of the invention, and constitute a part of the specification. The drawings illustrate embodiments of the invention, and together with the description, serve to explain the principles of the invention. Exemplary embodiments of the invention and descriptions thereof are intended to explain the invention, and do not constitute an improper limitation thereon.

DESCRIPTION OF THE EMBODIMENTS

To make a technical problem to be solved by the present invention, technical solutions, and beneficial effects more clearly, the present invention is further described below in detail with reference to accompanying drawings and embodiments. It should be understood that the specific embodiments described herein are merely intended to explain the present invention, and are not intended to limit the present invention.

The embodiments of the present invention are shown in FIG. 1 to FIG. 10.

Figure 1:
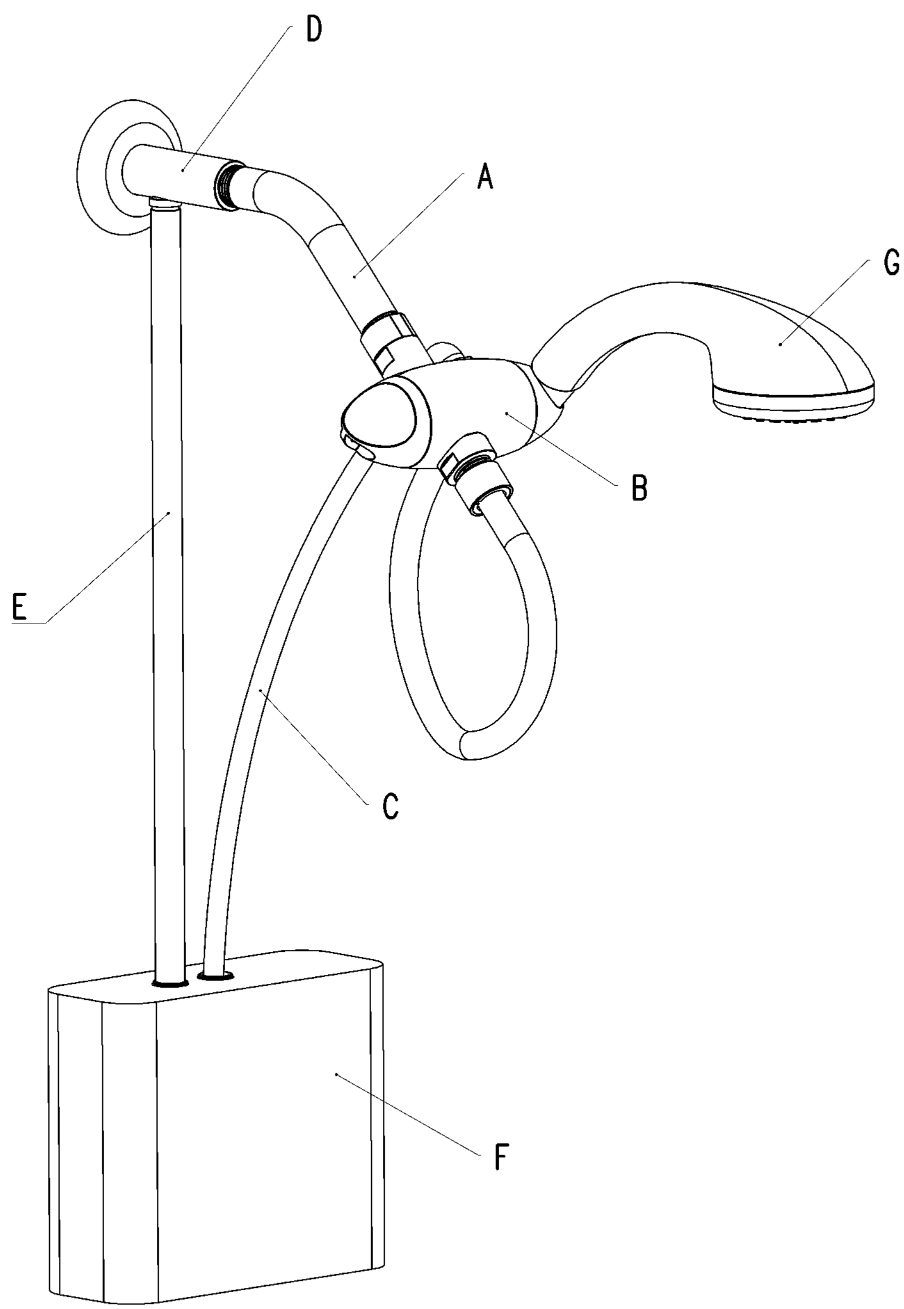
FIG. 1 is an installation view of a cold water recycling and reusing apparatus of the invention.

As shown in FIG. 1, a cold water recycling and reusing apparatus includes a water inlet pipe (A), a cold water recycling apparatus (B), a recycling pipe (C), a cold water return apparatus (D), a return pipe (E), a recycling container (F), and a water outlet terminal (G). The cold water recycling apparatus (B) is installed at a location near the water outlet terminal (G) of the water inlet pipe (A). The cold water return apparatus (D) is installed at a location behind the cold water recycling apparatus (B) of the water inlet pipe (A). The cold water recycling apparatus (B) enables cold water to flow into the recycling container (F) via the recycling pipe (C). The cold water return apparatus (D) then draws the water in the recycling container (F) into the water inlet pipe (A) via the return pipe (E). Afterwards, the water mixed with hot water and flows out of the water outlet terminal (G).

Figure 2:
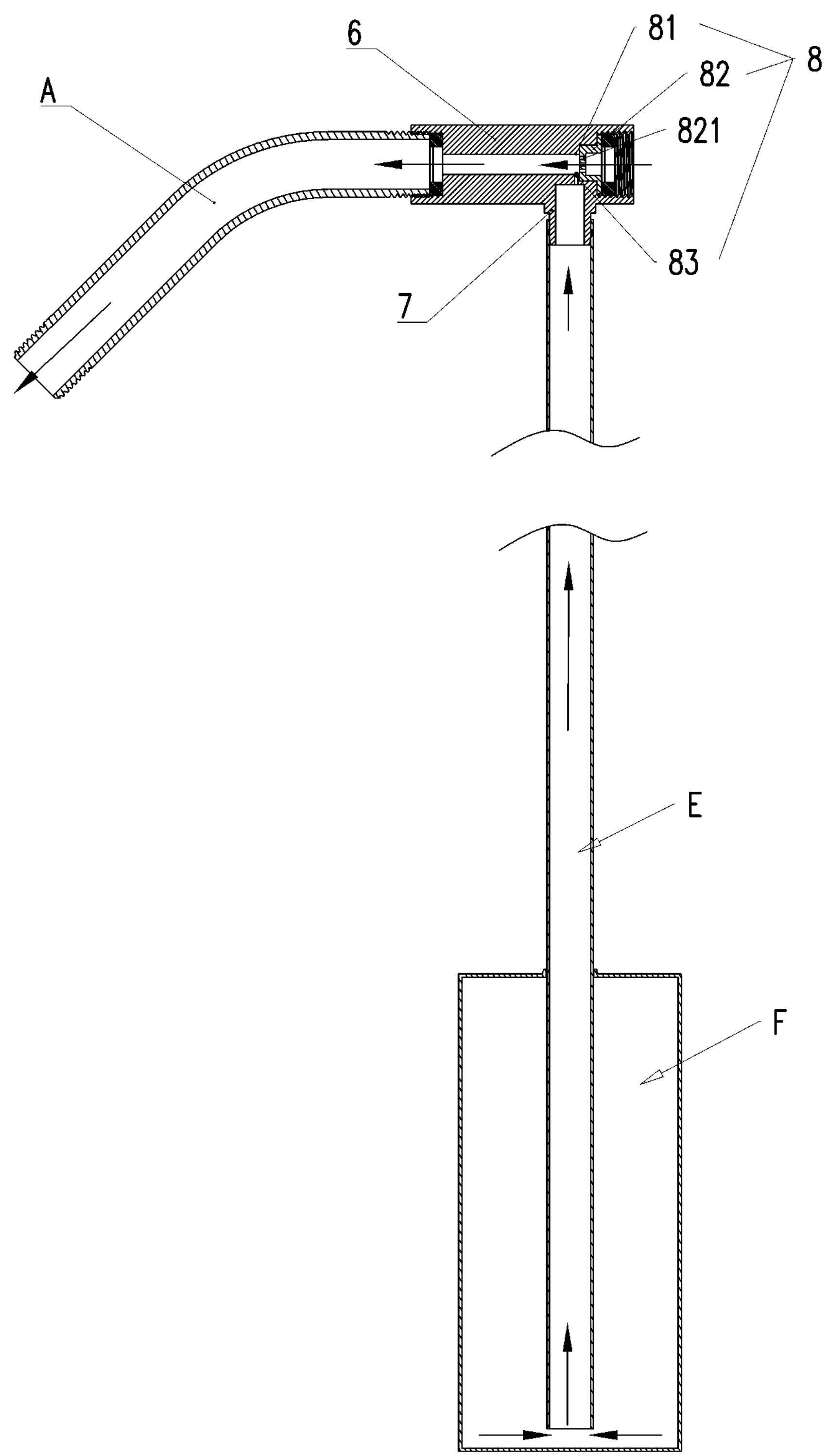
FIG. 2 is a structural view of a return apparatus according to a first embodiment of the invention.
Figure 3:
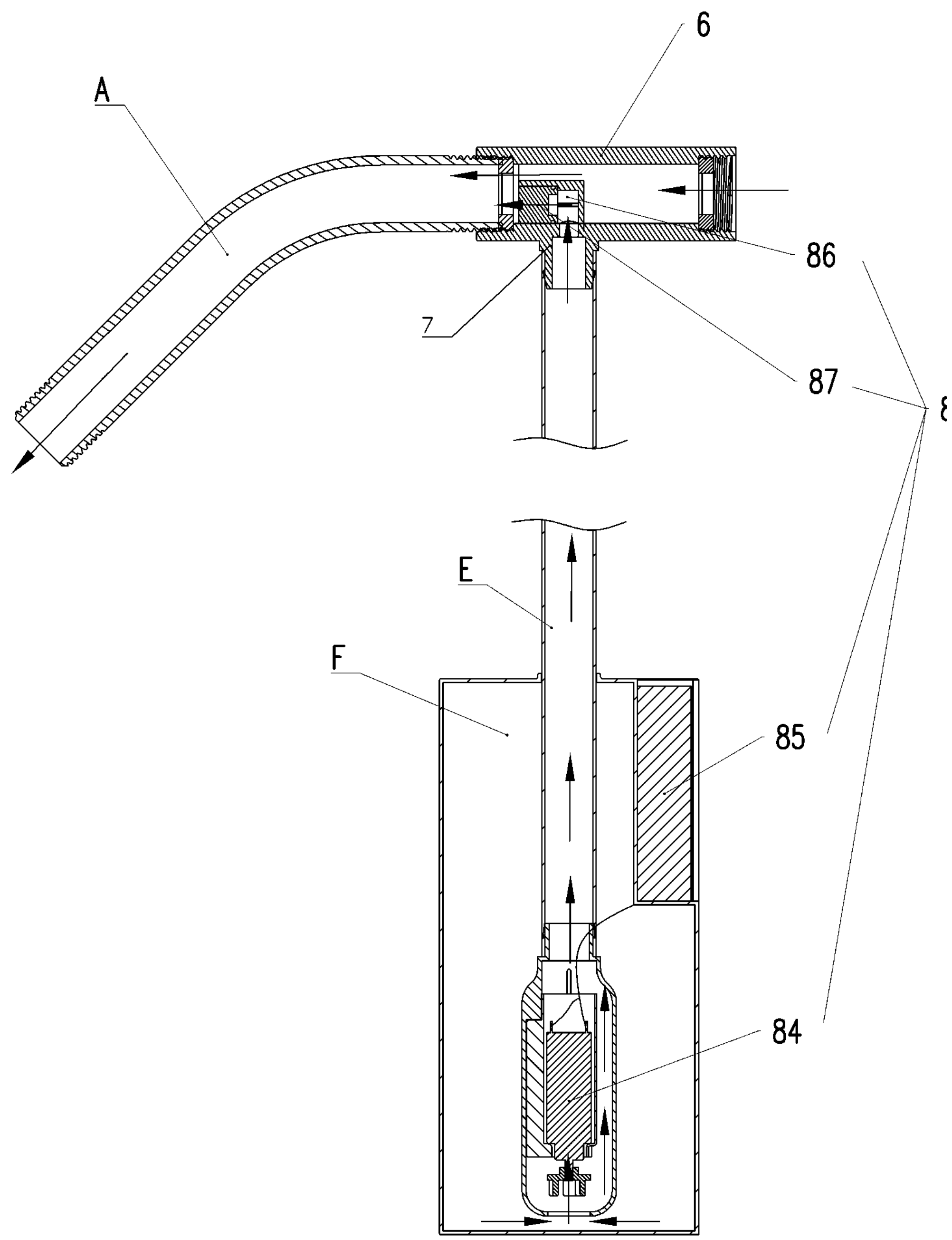
FIG. 3 is a structural view of a return apparatus according to a second embodiment of the present invention.
Figure 4:
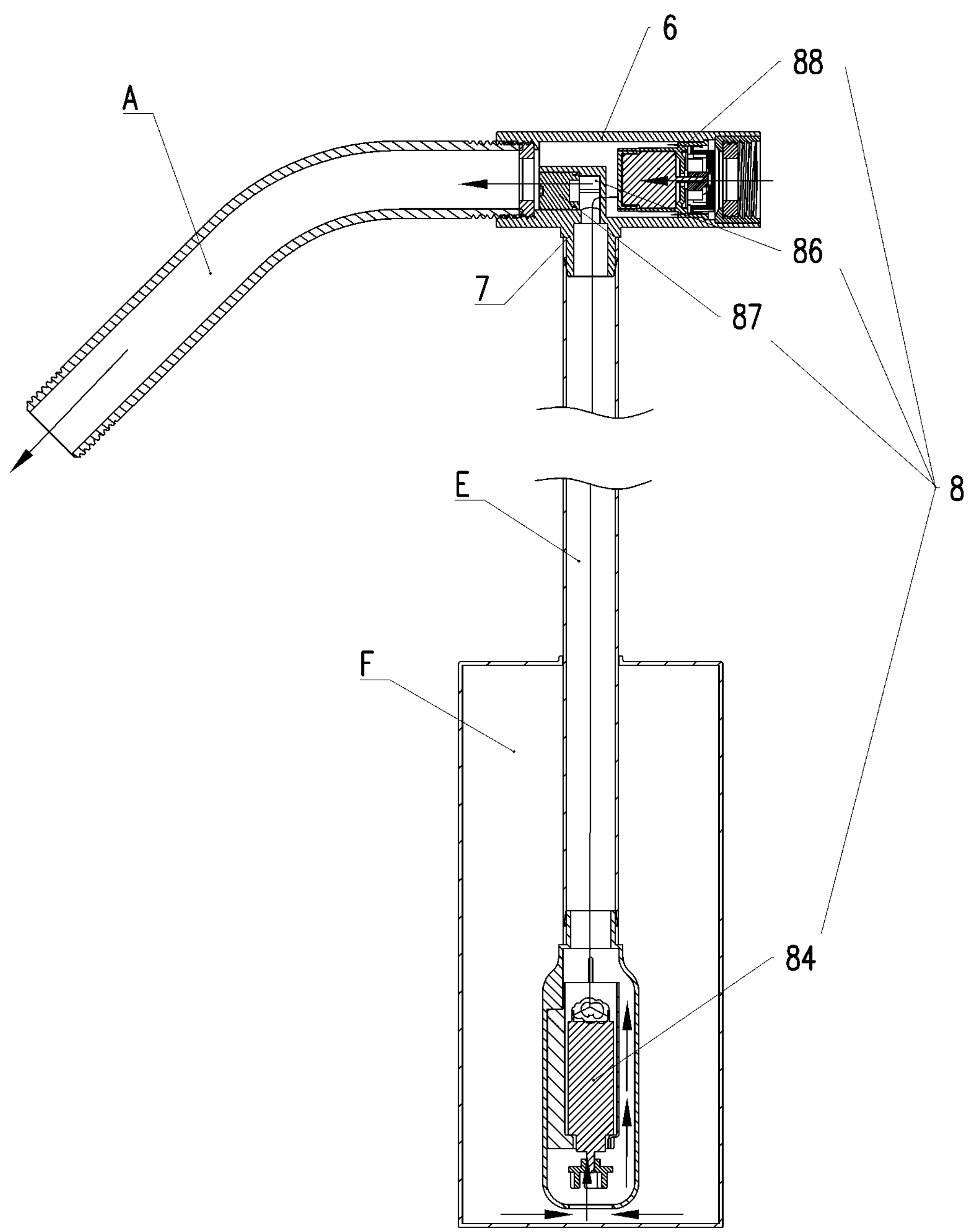
FIG. 4 is a structural view of a return apparatus according to a third embodiment of the present invention.
Figure 5:
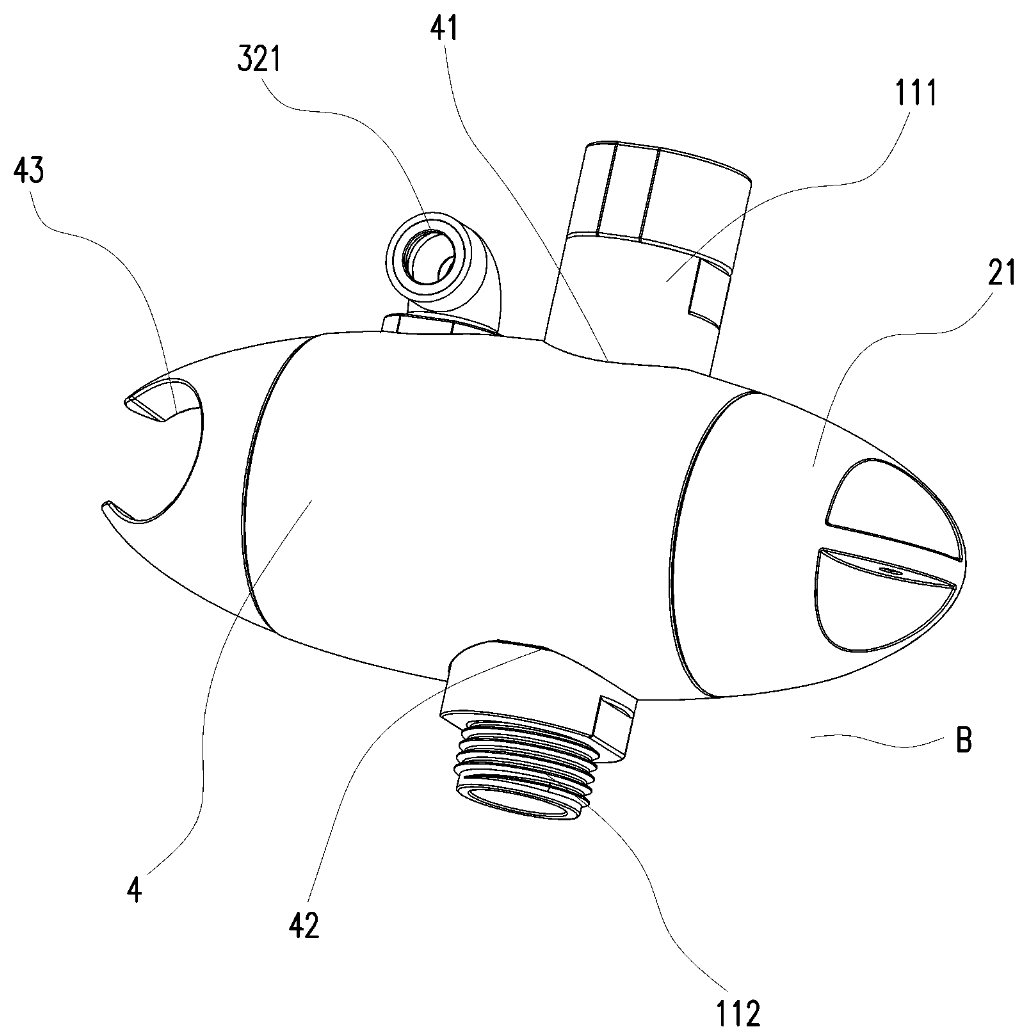
FIG. 5 is a perspective view of a recycling apparatus according to the invention.
Figure 6:
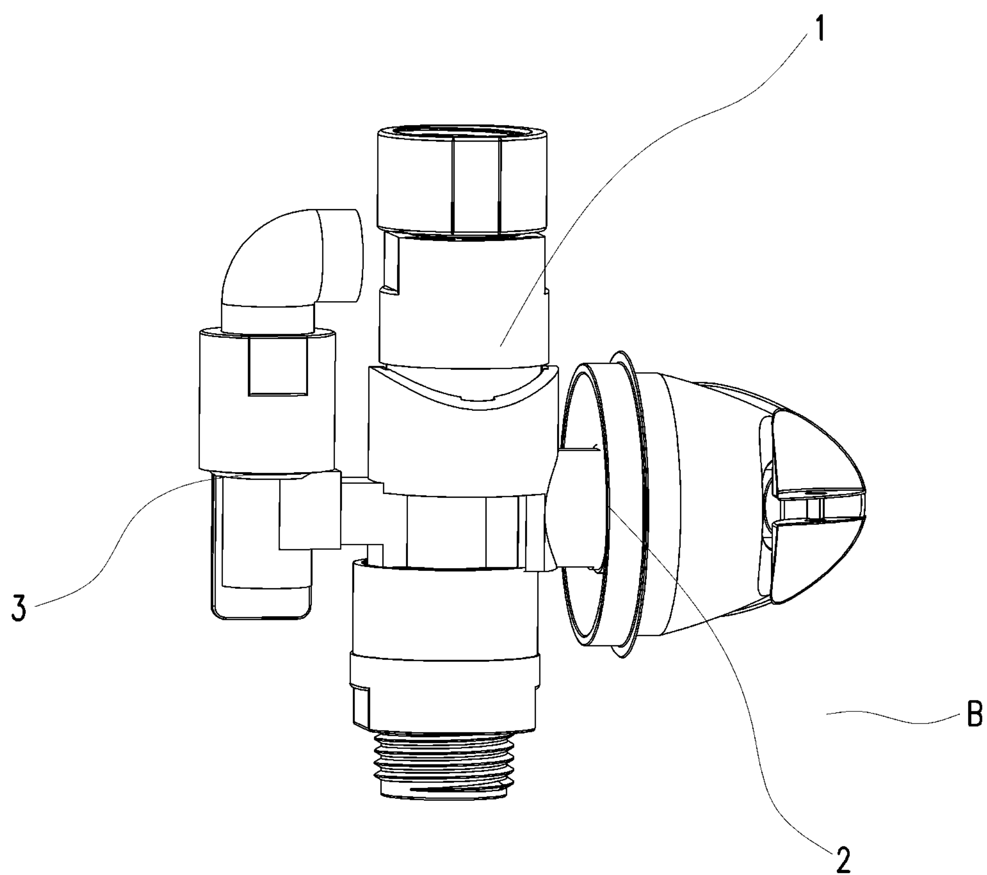
FIG. 6 is a perspective view of the recycling apparatus with the housing in FIG. 5 being removed.

As shown in FIG. 2 to FIG. 4, the cold water return apparatus (D) includes a return pipe body 6, a return connector 7, and a dynamic return structure 8. The return pipe body 6 is installed on the water inlet pipe (A). The return connector 7 is disposed on the return pipe body 6. The return connector 7 has an internal cavity in communication with that of the return pipe body 6. The return pipe (E) has one end connected to an end of the return connector 7, and another end inserted into the recycling container (F). The dynamic return structure 8 draws the water in the recycling container (F) back to the return pipe body 6 via the return pipe (E) and the return connector 7, such that the water flows into the water inlet pipe (A).

The dynamic return structure 8 includes three implementations. In the first embodiment, as shown in FIG. 2, the dynamic return structure 8 includes an altering segment 81 formed at a location where the internal cavity of the return pipe body and an internal cavity of the water inlet pipe communicate, so as to form a cavity in the internal cavity of the return pipe body 6, which thins down relative to the internal cavity of the water inlet pipe (A) (i.e., the internal cavity of the return pipe body 6 becomes thinner than the internal cavity of the water inlet pipe (A)). A plug 82 is installed at the altering segment 81, and having an end potion that is formed with a group of through holes 821, for ensuring water is accelerated when flowing through the plug 82 and forming a negative pressure. The return connector 7 and the return pipe body 6 are formed as one piece. A group of abruptly-thinning siphon holes 83 are formed at a location where the internal cavity of the return connector 7 and the internal cavity of the return pipe body 6 are connected. When the water in the water inlet pipe (A) flows through the plug 82, the negative pressure formed due to a siphon principle draws the water in the recycling container (F) into the cavity of the return pipe body 6 via the return pipe (E).

In a second embodiment, as shown in FIG. 3, the dynamic return structure 8 includes a pump 84 installed at a distal end of the return pipe (E). The pump 84 is connected to a battery case 85 received in the recycling container (F) by using a wire. The battery case 85 controls an operation of the pump 84 by using a floating switch. A return chamber 86 having an opening on one side thereof being formed at a location where the return connector 7 and the internal cavity of the return pipe body 6 communicate. A check valve 87 is disposed at the opening.

In a third embodiment, as shown in FIG. 4, the dynamic return structure 8 includes a pump 84 installed at a distal end of the return pipe (E), and a hydroelectric generator 88 installed at an end where the return pipe body 6 and the water inlet pipe are connected. The hydroelectric generator 88 is connected to the pump 84 by using a wire. The pump 84 is controlled by a floating switch to perform. A return chamber 86 having an opening on one side thereof is formed at a location where the return connector 7 and the internal cavity of the return pipe body 6 communicate. The check valve 87 is disposed at the opening.

As shown in FIG. 5 to FIG. 10, the cold water recycling apparatus (B) includes a housing 4, a temperature-sensing switch component 1, a hot water outlet control component 2, and a cold water switching component 3. The temperature-sensing switch component 1, the hot water outlet control component 2, and the cold water switching component 3 are disposed in the housing 4, and cooperate with each other for recycling cold water.

The temperature-sensing switch component 1 includes a case body 11 and a temperature-sensing switch apparatus 12. The case body 11 has a water inlet 111 and a water outlet 112 disposed thereon, and a water inlet channel 113, a cold water outlet channel 114, and a hot water outlet channel 115 disposed therein. The cold water outlet channel 114 and the hot water outlet channel 115 lead to the water outlet 112. The temperature-sensing switch apparatus 12 is installed at a location where the water inlet channel 113 and other channels (specifically, the cold water outlet channel 114 and the hot water outlet channel 115) communicate, and is adapted to automatically switch the water inlet channel 113 to communicate with the hot water outlet channel 115 or the cold water outlet channel 114 according to an incoming water temperature.

The hot water outlet control component 2 is installed in the hot water outlet channel 115, and is adapted to control whether to apply the hot water or not.

The cold water switching component 3 includes a cold water recycling channel 31 and a cold water switching apparatus 32. The cold water switching apparatus 32 is installed at a location where the cold water outlet channel 114 and the cold water recycling channel 31 communicate, and is adapted to switch the cold water flows out of the cold water outlet channel 114 or the cold water recycling channel 31.

In a shown embodiment, the temperature-sensing switch apparatus 12 may include a temperature-sensing spring 121, a reset spring 122, and a mandrel 123. A first positioning base 116 is disposed adjacent to an inlet of the water inlet channel 113. The positioning base 116 includes a base portion 1161 and a cylindrical protrusion 1162 protruding from the base portion. A cylindrical second positioning base 117 is disposed at a distal end of the water inlet channel 113. The second positioning base 117 has a side wall having an inlet of the cold water outlet channel 114 disposed thereon. The mandrel 123 is movably disposed between the first positioning base 116 and the second positioning base 117, and includes a circumferential platform shoulder 1231 disposed thereon, a rod-shaped portion 1232 located on one side of the circumferential platform shoulder 1231, and a hollow stick portion 1233 located on another side of the circumferential platform shoulder 1231. The rod-shaped portion 1232 is capable of moving in the cylindrical protrusion 1162. The hollow stick portion 1233 is capable of moving in the second positioning base 117. That is, the mandrel 123 has one end accommodated in the cylindrical protrusion 1162, and another end accommodated in the second positioning base 117. The temperature-sensing spring 121 is sleeved on the rod-shaped portion 1232 and the cylindrical protrusion 1162, and has one end abutting against the circumferential platform shoulder 1231, and another end abutting against the base portion 1161. The reset spring 122 has one end abutting against a bottom end of a hole of the hollow stick portion 1233, and another end abutting against a bottom portion of the second positioning base 117. A sealing ring 124 is disposed on the circumferential platform shoulder 1231. The circumferential platform shoulder 1231 cooperates with an opening of the second positioning base 117 to enable or disable the communication between the water inlet channel 113 and the cold water outlet channel 114. Specifically, when hot water has not arrived, the circumferential platform shoulder 1231 is separated from the opening of the second positioning base 117, and the water inlet channel 113 communicates with the cold water outlet channel 114. However, when the hot water arrives, the temperature-sensing spring 121 expands and becomes longer to push the circumferential platform shoulder 1231 to move to the second positioning base 117. Meanwhile, the reset spring 122 is compressed until the opening of the second positioning base 117 is closed, so that the water inlet channel 113 is not in communication with the cold water outlet channel 114. When the incoming water stops provided, as temperature in the water inlet channel 113 decreases, the temperature-sensing spring 121 becomes shorter. Under an action of resilience force of the reset spring 122, the circumferential platform shoulder 1231 moves away from the second positioning base 117, and returns back to an initial state, that is, the water inlet channel 113 communicates with the cold water outlet channel 114.

In the shown embodiments, the hot water outlet control component 2 includes an operating member 21, a valve base 22, a first valve core 23, and a reset spring 24. The operating member 21 is fixedly connected to the first valve core 23 by using, for example, a screw 25. The valve base 22 is fixedly installed in the case body 11 and has an outer wall having a first sealing ring 26 that is disposed thereon to prevent water leakage. The valve base 22 includes a small-diameter hole part 221 and a large-diameter hole part 222 communicate with each other. The first valve core 23 movably penetrates the small-diameter hole part 221 and the large-diameter hole part 222 of the valve base 22. The first valve core 23 is sealedly jointed with the small-diameter hole part 221 by using a second sealing ring 27 installed thereon to prevent water leakage. The first valve core 23 has a distal end having a circumferential sealing ring installation groove 231 disposed thereon. The circumferential sealing ring installation groove 231 has a third sealing ring 28 installed therein. The distal end of the first valve core 23 cooperates with an inlet of the hot water outlet channel 115, to open or close the hot water outlet channel 115, that is, so that the water inlet channel 113 is communicated with or is not communicated with the hot water outlet channel 115. The reset spring 24 is sleeved on the first valve core 23, and has one end abutting against the sealing ring installation groove 231, and another end abutting against an adjacency between the small-diameter hole part 221 and the large-diameter hole part 222, that is, a bottom portion of the large-diameter hole part 222. When the hot water needs to be turned on, the operating member 21 is pulled out, the reset spring 24 is compressed, the distal end of the first valve core 23 leaves the inlet of the hot water outlet channel 115, and the hot water enters the hot water outlet channel 115 from the water inlet channel 113. Because the incoming water (the hot water) has pressure, the water inlet channel 113 retains in communication with the hot water outlet channel 115. After the incoming water is turned off, there is no pressure in the water inlet channel 113, the distal end of the first valve core 23 moves to the inlet of the hot water outlet channel 115 under an action of elastic force of the reset spring 24, until the inlet of the hot water outlet channel 115 is closed, so that the water inlet channel 113 is not in communication with the hot water outlet channel 115.

In this case, the distal end of the first valve core 23 includes an axial opening 232. A wall of the inlet of the hot water outlet channel 115 has a protrusion 1151 disposed thereon and the protrusion 1151 movably received in the axial opening 232. On one hand, the protrusion 1151 plays a role in supporting the first valve core 23. On the other hand, the protrusion 1151 plays a role in guiding.

In the shown embodiments, the cold water switching apparatus 32 may include a rotatable cold water recycling pipe connector 321, a valve base 322, a second valve core 323, and a spring 324. The cold water recycling pipe connector 321 is screwedly coupled to the valve base 322, and includes a first position and a second position spaced from each other in 90 degrees. A spacing base 3211 is disposed in the cold water recycling pipe connector 321. The valve base 322 is installed in the cold water recycling channel 31. The second valve core 323 is movably disposed in an empty cavity of the valve base 322, and has one end abutting against a bottom portion of the spacing base 3211, that is, the second valve core 323 is driven by the cold water recycling pipe connector 321. The second valve core 323 has a circumferential convex shoulder 3231 disposed thereon and having a seal ring 325 that is installed thereon. The spring 324 has one end abutting against a bottom portion of the valve base 322, and another end abutting against the circumferential convex shoulder 3231. When the cold water recycling pipe connector 321 is at the first position (shown in FIG. 7), the circumferential convex shoulder 3231 closes the cold water recycling channel 31, so that the cold water flows out of the cold water outlet channel 114. When the cold water recycling pipe connector 321 is located at the second position (shown in FIG. 8), the circumferential convex shoulder 3231 closes the cold water outlet channel 114, so that the cold water flows out of the cold water recycling channel 31. Certainly, a structure of the second valve core 323 is not limited thereto.

In addition, the housing 4 of the cold water recycling apparatus (B) is movably coupled to the operating member 21, so as to form an approximately ellipsoidal structure. The housing 4 has openings 41, 42 for respectively accommodating the water inlet 111 and the water outlet 112. In addition, a shower head receiving portion 43 is further disposed on the housing 4 for placement of a shower head (the water outlet terminal (G)). Certainly, the shower head may also be directly installed on the water outlet 112.

Preferably, a check valve 5 is installed at an outlet of the hot water outlet channel 115.

Preferably, a filter is further disposed at the inlet of the water inlet channel to prevent a foreign matter from entering.

Figure 7:
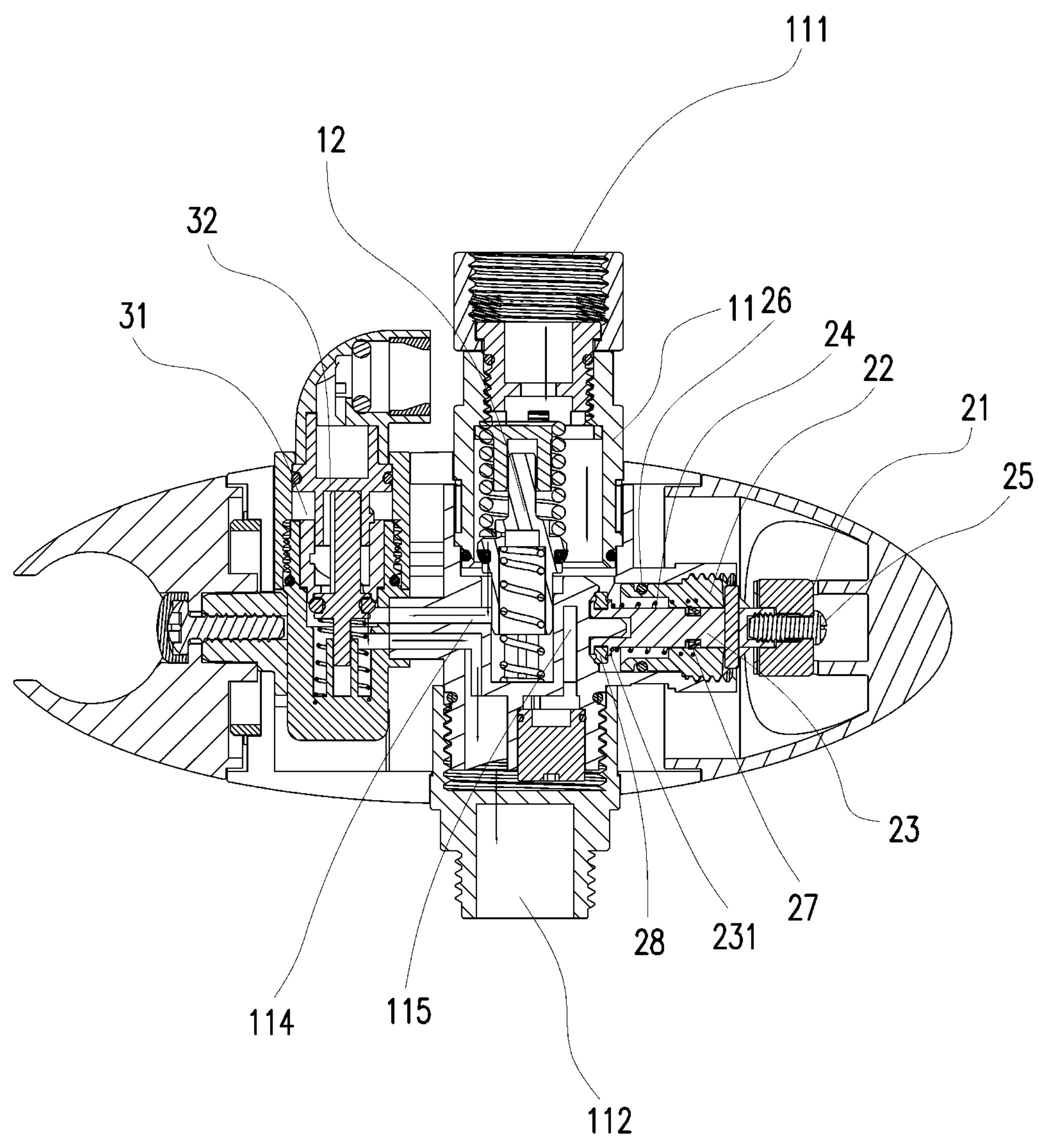
FIG. 7 is a sectional view of the recycling apparatus in FIG. 5, illustrating that cold water is discharged from a cold water outlet channel.
Figure 8:
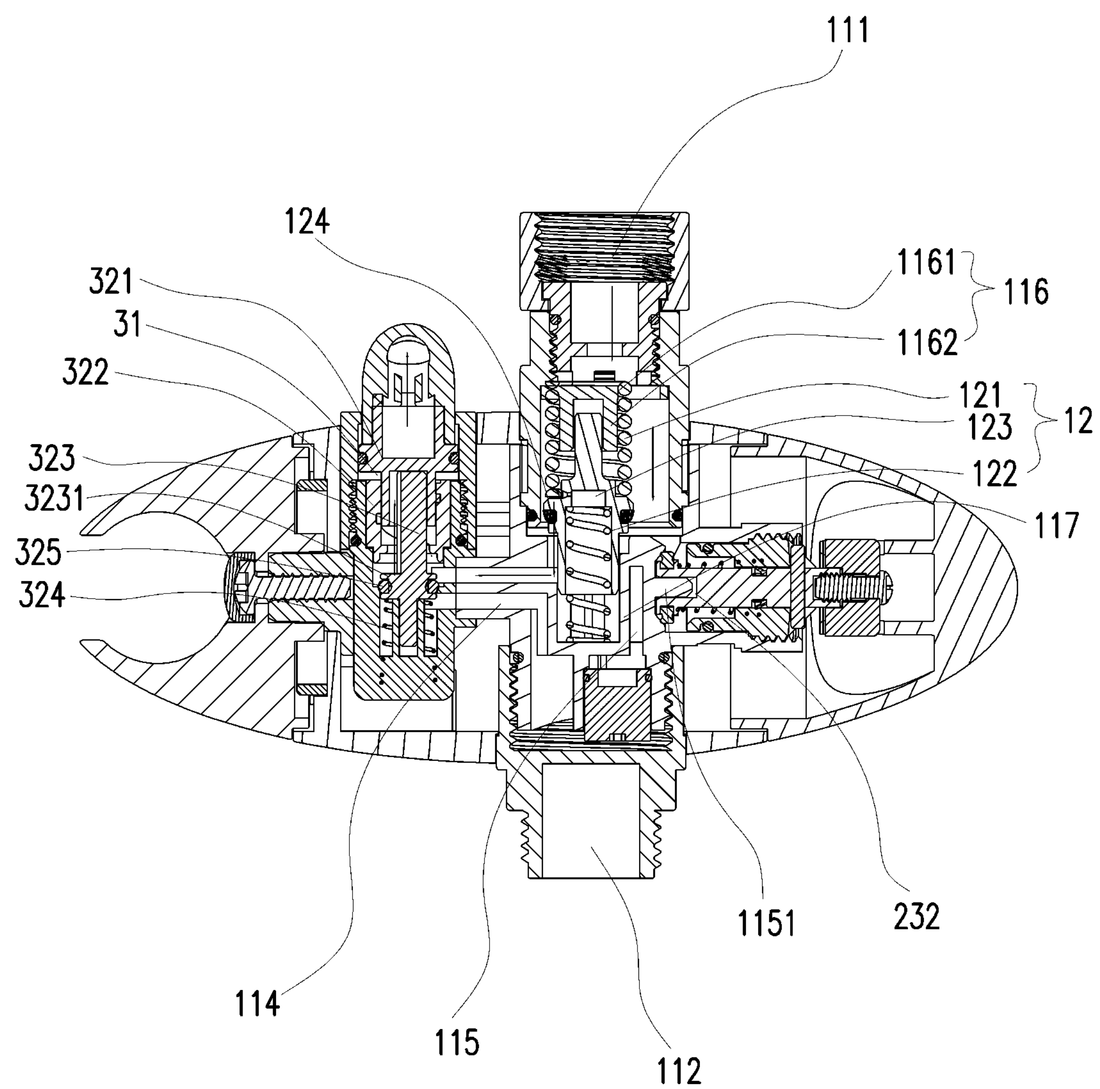
FIG. 8 is a sectional view of the recycling apparatus in FIG. 5, illustrating that the cold water is discharged from a cold water recycling channel.
Figure 9:
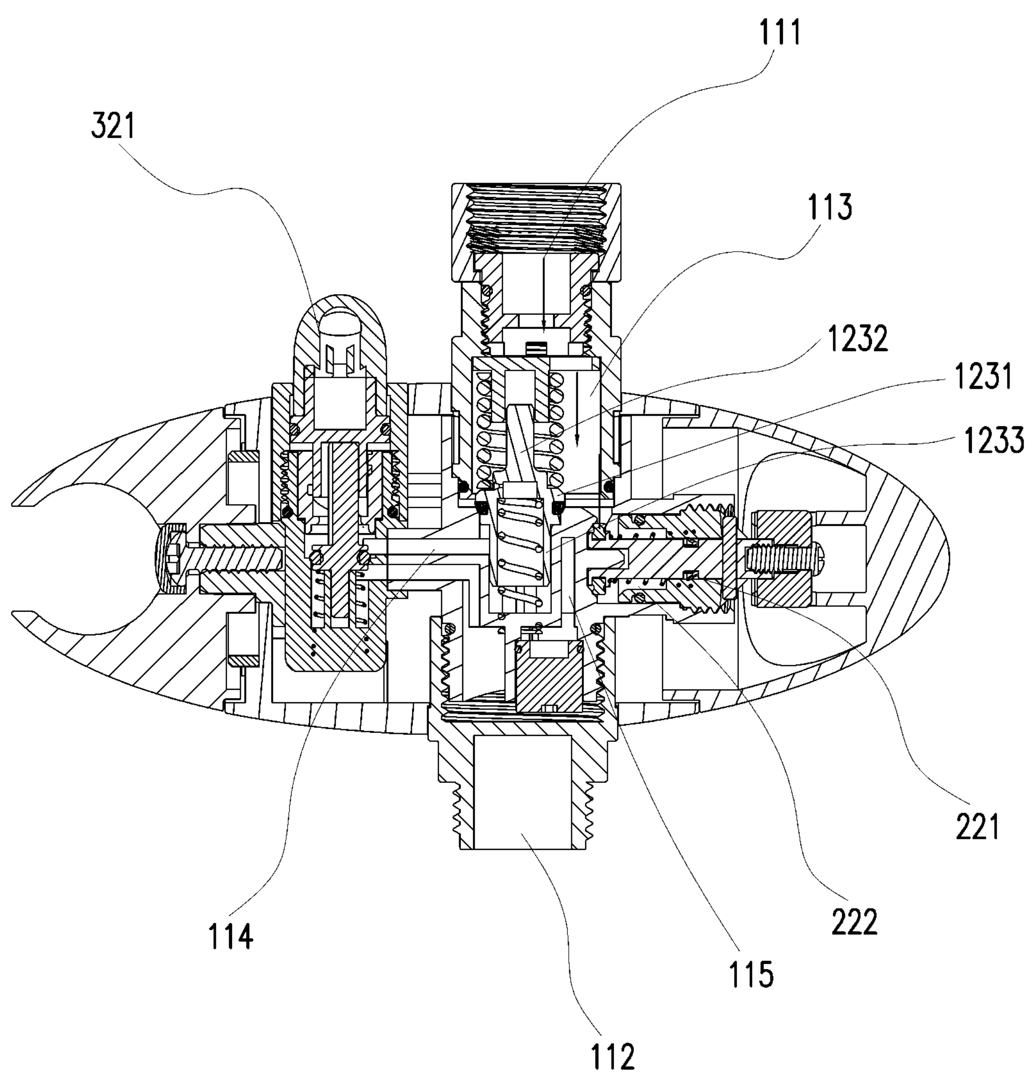
FIG. 9 is a sectional view of the recycling apparatus in FIG. 5, illustrating that hot water is standby.
Figure 10:
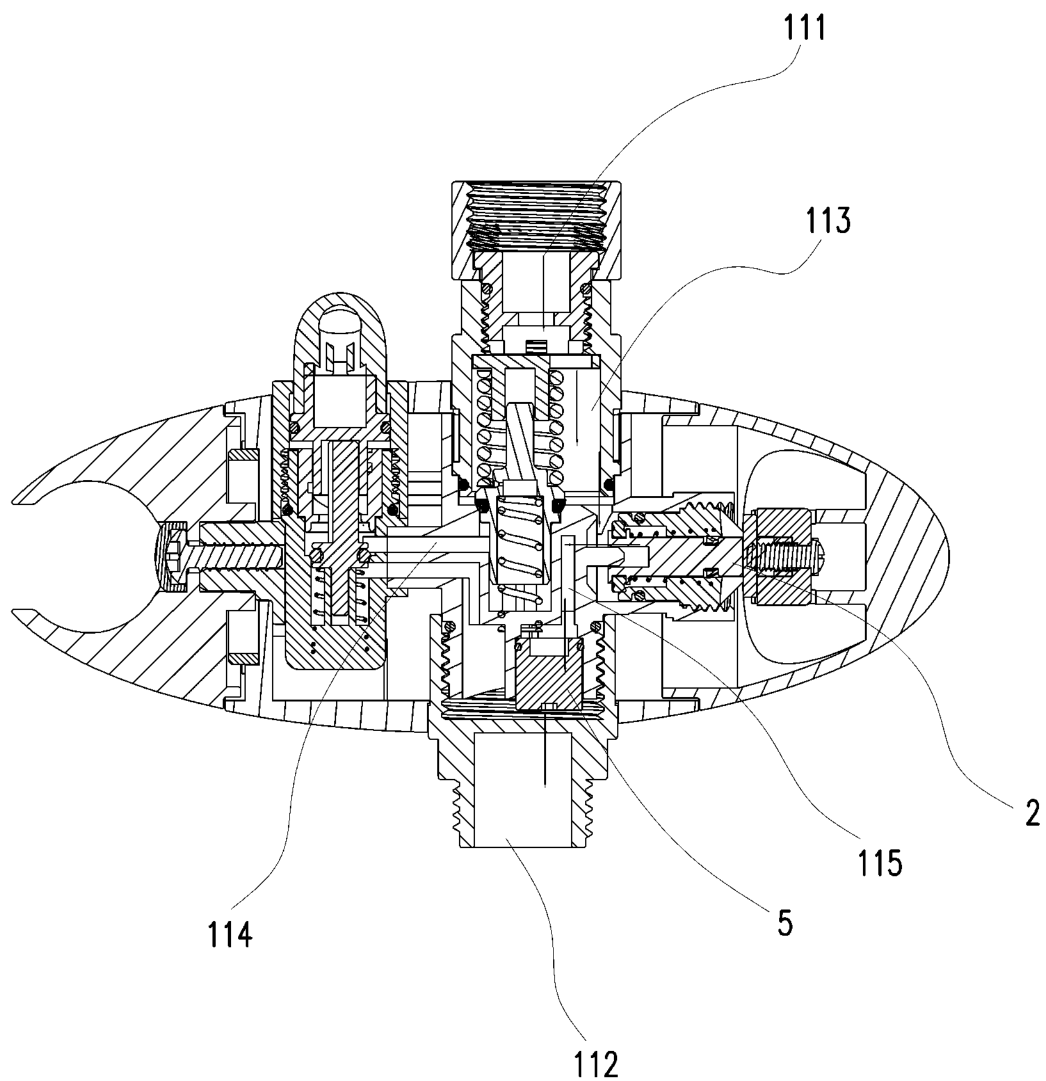
FIG. 10 is a sectional view of the recycling apparatus in FIG. 5, illustrating that the hot water is in a state of use.

When the invention is in state of use, in an initial state, the inlet of the cold water outlet channel 114 is in an opened state, and the inlet of the hot water outlet channel 115 is in a closed state. If the cold water recycling pipe connector 321 is already connected to the cold water recycling pipe 321, the cold water outlet channel 114 is closed by default, and the cold water recycling channel 31 is opened. After a water inlet valve is opened, because initial incoming water is cold water, the temperature-sensing switch apparatus 12 performs no operation. Therefore, the cold water is discharged from the cold water recycling channel 31 by default. As shown in FIG. 8, the water flows along a flow path illustrated in dotted arrows in FIG. 8. The cold water flows back into the recycling container (F) along the recycling pipe (E). If it is relatively troublesome or not conveniently to add the recycling container (F), an operator only requires to make 90 degrees rotation of the cold water recycling pipe connector to the first position. As shown in FIG. 7, since the cold water recycling channel 31 is closed, the cold water is discharged to the shower head via the cold water outlet channel 114 to flow out. At this time, the water flows along a flow path of dotted arrows in FIG. 7. After the cold water is completely discharged, hot water enters the water inlet channel 113, and the temperature-sensing switch apparatus 12 starts performing to close the inlet of the cold water outlet channel 114. FIG. 9 shows the cold water recycling apparatus in a state in which hot water is standby. Both the inlet of the cold water outlet channel 114 and the inlet of the hot water outlet channel 115 are closed, so there's no water flowing out. When the hot water needs to be used, the operating member 21 is pulled, the inlet of the hot water outlet channel 115 is opened, and the hot water flows out of the water outlet via the hot water outlet channel 115, as shown in FIG. 10. At this time, the hot water flows along a flow path illustrated in dotted arrows in FIG. 10. After the water inlet valve is closed, due to loss of pressure, under a resilience force of the reset spring 24 of the hot water outlet control component 2, the inlet of the hot water outlet channel 115 is closed without water flowing out. After water temperature of the water inlet channel 113 decreases, the cold water recycling apparatus (B) returns to the initial state.

When water in the recycling container (F) is stored to a certain degree, a water level in the recycling container (F) slowly rises. After a period of time, hot water arrives, and the rise of the water level stops. In this case, the operating member 21 is started, and the hot water flows out of the shower head. Meanwhile, with the dynamic return structure 8, as shown in FIG. 2, the cold water in the recycling container (F) slowly flows back to the water inlet pipe (A) via the return pipe 6 due to air pressure by the siphon principle. After the cold water is mixed with the hot water, the mixed water flows out of the shower head. The cold water in the recycling container (F) is drawn out during bath, and is available for preparation of next bath.

The foregoing descriptions show and describe the exemplary embodiments of the present invention. As described above, it should be understood that the present invention is not limited to the form disclosed in this specification, should not be considered as an exclusion of another embodiment, is applicable to various other combinations, modifications, and environments, and can be altered according to the foregoing instructions or technologies or knowledge in a related field within the concept scope of the present invention described in this specification. Alternations and changes made by a person in the prior art do not depart from the spirit and scope of the present invention, and shall all fall within the protection scope of the claims appended to the present invention.

What is claimed is:

1. A cold water recycling and reusing apparatus, comprising a water inlet pipe, a cold water recycling apparatus, a recycling pipe, a cold water return apparatus, a return pipe, a recycling container, and a water outlet terminal, wherein the cold water recycling apparatus is installed at a location near the water outlet terminal of the water inlet pipe, the cold water return apparatus is installed at a location behind the cold water recycling apparatus of the water inlet pipe, the cold water recycling apparatus enables cold water to flow into the recycling container via the recycling pipe, the cold water return apparatus draws the water in the recycling container into the water inlet pipe via the return pipe, the water is adapted to mix with hot water and flows out of the water outlet terminal, wherein the cold water return apparatus includes a return pipe body, a return connector, and a dynamic return structure, wherein the return pipe body is installed on the water inlet pipe, the return connector is disposed on the return pipe body, the return connector has an internal cavity in communication with that of the return pipe body, the return pipe has one end connected to an end of the return connector, and another end inserted into the recycling container, and the dynamic return structure draws the water in the recycling container to the return pipe body via the return pipe and the return connector, such that the water flows into the water inlet pipe.

2. The cold water recycling and reusing apparatus according to claim 1, wherein the cold water recycling apparatus includes a housing, a temperature-sensing switch component, a hot water outlet control component, and a cold water switching component, wherein the temperature-sensing switch component, the hot water outlet control component, and the cold water switching component are disposed in the housing, and cooperate with each other for recycling cold water, and wherein:

the temperature-sensing switch component includes a case body and a temperature-sensing switch apparatus, wherein the case body has a water inlet and a water outlet disposed thereon, and a water inlet channel, a cold water outlet channel, and a hot water outlet channel disposed therein, the cold water outlet channel and the hot water outlet channel lead to the water outlet, and the temperature-sensing switch apparatus is installed at a location where the water inlet channel, the cold water outlet channel, and the hot water outlet channel communicate, and is adapted to automatically switch the water inlet channel to communicate with the hot water outlet channel or the cold water channel according to an incoming water temperature;

the hot water outlet control component is installed in the hot water outlet channel, and is adapted to control whether to apply the hot water or not; and the cold water switching component includes a cold water recycling channel and a cold water switching apparatus, wherein the cold water switching apparatus is installed at a location where the cold water outlet channel and the cold water recycling channel communicate, and is adapted to switch the cold water to flow out of the cold water outlet channel or the cold water recycling channel.

3. The cold water recycling and reusing apparatus according to claim 2, wherein the temperature-sensing switch apparatus includes a temperature-sensing spring, a reset spring, and a mandrel, wherein a first positioning base is disposed adjacent to an inlet of the water inlet channel, the first positioning base includes a base portion and a cylindrical protrusion protruding from the base portion, a cylindrical second positioning base is disposed at a distal end of the water inlet channel, the second positioning base has a side wall having an inlet of the cold water outlet channel disposed thereon, the mandrel is movably disposed between the first positioning base and the second positioning base, and includes a circumferential platform shoulder disposed thereon, a rod-shaped portion located on a side of the circumferential platform shoulder, and a hollow stick portion located on another side of the circumferential platform shoulder, the rod-shaped portion is capable of moving in the cylindrical protrusion, the hollow stick portion is capable of moving in the second positioning base, the temperature-sensing spring is sleeved on the rod-shaped portion and the cylindrical protrusion, and has one end abutting against the circumferential platform shoulder, and another end abutting against the base portion, the reset spring has one end abutting against a bottom end of a hole of the hollow stick portion, and another end abutting against a bottom portion of the second positioning base, the circumferential platform shoulder cooperates with an opening of the second positioning base, and a sealing ring is disposed on the circumferential platform shoulder;

the hot water outlet control component includes an operating member, a valve base, a first valve core, and a reset spring, wherein the operating member is fixedly connected to the first valve core, the valve base is fixedly installed in the case body and has an outer wall having a first sealing ring that is disposed thereon, the valve base includes a small-diameter hole part and a large-diameter hole part in communication with each other, the first valve core movably penetrates the small-diameter hole part and the large-diameter hole part of the valve base, the first valve core is sealedly jointed with the small-diameter hole part via a second sealing ring, and has a distal end having a circumferential sealing ring installation groove disposed thereon, the sealing ring installation groove has a third sealing ring installed therein, the distal end of the first valve core cooperates with an inlet of the hot water outlet channel, the reset spring is sleeved on the first valve core, and has one end abutting against the sealing ring installation groove, and another end abutting against an adjacency between the large-diameter hole part and the small-diameter hole part; and the cold water switching apparatus includes a rotatable cold water recycling pipe connector, a valve base, a second valve core, and a spring, the cold water recycling pipe connector is screwedly coupled to the valve base, and includes a first position and a second position spaced from each other in 90 degrees, the second valve core is movably disposed in an empty cavity of the valve base, and is driven by the cold water recycling pipe connector, the spring has one end abutting against the second valve core, and another end abutting against a bottom portion of the valve base, when the cold water recycling pipe connector is at the first position, the second valve core closes the cold water recycling channel, so that the cold water flows out of the cold water outlet channel, and when the cold water recycling pipe connector is at the second position, the second valve core closes the cold water outlet channel, so that the cold water flows out of the cold water recycling channel.

4. The cold water recycling and reusing apparatus according to claim 3, wherein the distal end of the first valve core has an axial opening, a wall of the inlet of the hot water outlet channel has a protrusion disposed thereon and movably received in the axial opening; and wherein a circumferential convex shoulder is disposed on the second valve core, a seal ring is installed on the circumferential convex shoulder, the spring has one end abutting against the bottom portion of the valve base, and another end abutting against the circumferential convex shoulder, when the cold water recycling pipe connector is at the first position, the circumferential convex shoulder closes the cold water recycling channel, so that the cold water flows out of the cold water outlet channel, and when the cold water recycling pipe connector is at the second position, the circumferential convex shoulder closes the cold water outlet channel, so that the cold water flows out of the cold water recycling channel.

5. The cold water recycling and reusing apparatus according to claim 2, wherein a check valve is installed at an outlet of the hot water outlet channel.

6. The cold water recycling and reusing apparatus according to claim 1, wherein the dynamic return structure of the cold water return apparatus includes an altering segment formed at a location where the internal cavity of the return pipe body and an internal cavity of the water inlet pipe communicate, so as to form a cavity in the internal cavity of the return pipe body, which thins down relative to the internal cavity of the water inlet pipe, and a plug installed on the altering segment, and having an end portion that is formed with a group of through holes for ensuring water is accelerated when flowing through the plug and forming a negative pressure, wherein the return connector and the return pipe body are formed as one piece, a group of abruptly-thinning siphon holes are formed at a location where the internal cavity of the return connector and the internal cavity of the return pipe body are connected, and when water in the water inlet pipe flows through the plug, the negative pressure formed due to a siphon principle draws water in the recycling container into the cavity of the return pipe body via the return pipe.

7. The cold water recycling and reusing apparatus according to claim 1, wherein the dynamic return structure of the cold water return apparatus includes a pump installed at a distal end of the return pipe, the pump being connected to a battery case and a floating switch that are received in the recycling container, a return chamber having an opening on a side thereof being formed at a location where the return connector and the internal cavity of the return pipe body communicate, and a check valve being disposed at the opening.

8. The cold water recycling and reusing apparatus according to claim 1, wherein the dynamic return structure of the cold water return apparatus includes a pump installed at a distal end of the return pipe, and a hydroelectric generator installed at an end where the return pipe body and the water inlet pipe are connected, the hydroelectric generator being connected to the pump, a return chamber having an opening on a side thereof being formed at a location where the return connector and the internal cavity of the return pipe body communicate, and a check valve being disposed at the opening.

* * * * *